Jan. 18, 1938. D. O. SPROULE 2,105,675
MEANS FOR DELIVERING AN INTERMITTENT ELECTRICAL CURRENT
Filed March 29, 1935

Donald Orr Sproule
INVENTOR his ATT'Y.

Patented Jan. 18, 1938

2,105,675

UNITED STATES PATENT OFFICE 2,105,675

MEANS FOR DELIVERING AN INTERMITTENT ELECTRICAL CURRENT

Donald Orr Sproule, Ilford, England, assignor of one-half to Henry Hughes & Son, Limited, London, England Application March 29, 1935, Serial No. 13,652
In Great Britain April 6, 1934

3 Claims. (Cl. 175—365)

This invention relates to improvements in means for delivering an intermittent electrical current at high potential to an output circuit and has for one of its objects to provide means which when energized from a source of electrical energy at low potential will deliver electrical discharges to an output circuit at enhanced potential and/or current value at predetermined intervals of time.

Another object of the invention is to provide simple, inexpensive and compact means for the purpose specified adapted to operate reliably for a long period of time without skilled attention.

A further object of the invention is to provide means for the purpose specified which when arranged for remote control are less liable to disturbances of the timed relations between the actuating mechanism and the moment of discharge by variations in the potential of the source of supply of electrical energy than is usual with apparatus of this character.

A further object of the invention is to provide more efficient means for setting up, under certain conditions, high frequency electrical oscillatory discharges of a condenser without the employment of a spark gap than has been possible in the past.

It is well known that when the charging current to a circuit comprising an electrical inductance and an electrostatic capacity is interrupted, a surge of electrical energy into the condenser takes place thus setting up electrical oscillations having a frequency which depends on the inductance, capacity and resistance values of the circuit.

Also it has been proposed to generate an intermittent current with apparatus comprising an electrical inductance connected in electrical parallel with an electrical condenser and switching means for charging said condenser from a source of continuous current and for discharging said condenser repeatedly at regular time intervals.

This invention is characterized in that the condenser is connected to the output circuit at the first peak of the condenser voltage oscillation so as to deliver an intermittent current to the output circuit at an enhanced potential and/or current value relatively to the supply source of continuous electrical current.

In carrying the invention into practical effect, electrical energy is received from a direct current supply during an interval of time, and stored mainly as magnetic energy in an inductance, the impedance of which is large compared with the impedance of the low impedance output circuit, said magnetic energy being transferred periodically to a condenser and delivered to the low impedance output circuit at enhanced potential and/or current values as discharges during intervals of time, which are short compared with the charging times, the operations being effected by a storage circuit comprising an electrical inductance shunted by an electrical condenser to form an oscillatory electrical circuit, a switch connecting said oscillatory electrical circuit to the direct current supply temporarily and disconnecting said circuit from said supply subsequently, and a time controlled switch connecting said oscillatory circuit to said output circuit at the first peak of the condenser voltage oscillation.

In order that the nature of this invention may be the better understood, the example thereof shown in the figures of the drawing attached will be described with the assistance of the reference letters, each of which is applied to the same or an equivalent part in the several figures, in which:—

The diagram, (Figure 1), shows an arrangement suitable for use with a magnetostrictive echo sounding transmitter and devices associated therewith, but obviously the invention is not restricted to such use.

In this diagram $a$ is a switch connected to the continuous current mains and operated in the ordinary way by the constant speed electric motor $a^1$ of an echo sounding apparatus.

The electric motor $a^1$ comprises the usual armature $a^2$, brushes $a^3$ and field coil $a^4$ and is controlled as to speed by the centrifugal governor device $a^5$ which upon an excess of speed displaces the contact disc $a^6$ rightwardly to complete a circuit through the contact $a^7$, resistance $a^8$, conductor $a^9$, brush $a^{10}$ and disc $a^6$, thus causing the speed of the motor $a^1$ to diminish to normal when the resistance $a^8$ is included in the field circuit again.

The electrical resistances $b$ and $c$ are of appropriate value and $d$ is an iron cored choke or electrical inductance with an electrical condenser $e$ connected in parallel therewith; $f$ is an electromagnetic device adapted to operate an armature $g$ having a duplex contact $h$ $i$ against an elastic resistance, shown as a spiral spring $k$; $l$ is an electrical condenser; $m$ and $n$ are fixed contacts and $o$ and $p$ are terminals for connection to the low potential impedance toroidal coil $z$ of a magnetostrictive echo sounding transmitter.

Such an arrangement provides either for the continuous current mains or for the low impedance toroidal coil $z$ of a magnetostrictive echo sounding transmitter being connected with the oscillatory storage circuit, consisting of an electrical inductance such as the choke $d$ shunted by the condenser $e$, by switching means $h\ i\ m\ n$ operated by the electromagnetic device $f$ controlled by the switch $a$ of the echo sounding mechanism at proper time intervals.

Figure 1:
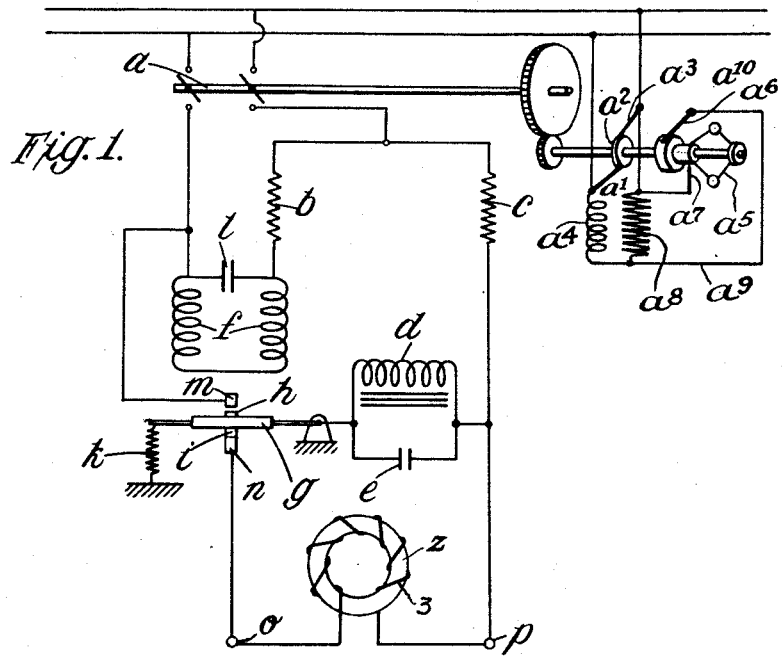
Figure 1 is a diagram of the electrical circuit in its simplest form.
Figure 2:
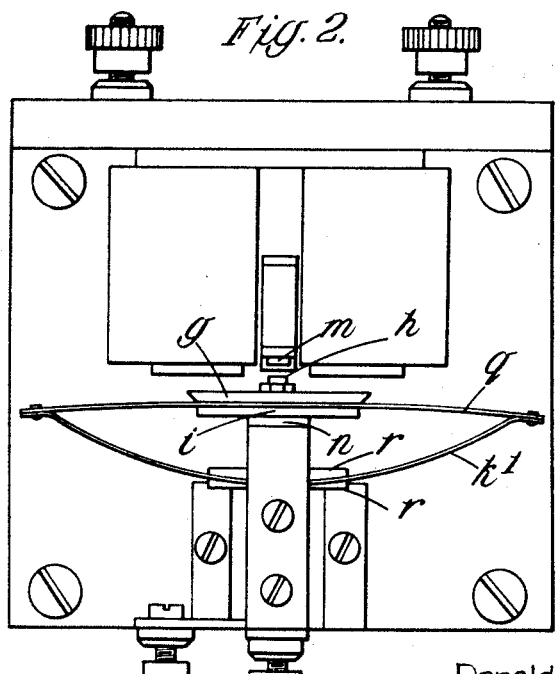
Figure 2 is a front elevation of one kind of device suitable for use with the invention.

As shown in Figure 2, the switching means $h\ i\ m\ n$ comprises a charging contact $m$ and a transferring contact $n$ with the duplex movable contact $h\ i$ arranged between them as in Figure 1, said movable contact $h\ i$ being attached to the armature $g$ which is mounted on a strip $q$ stressed by a bow shaped spring $k^1$.

The bow shaped spring $k^1$ is clamped between the pair of jaws $r\ r$ which have a terminal $s$ in electrical connection therewith so as to afford simple means for completing the electrical circuit through the direct current supply and the storage circuit $d\ e$ or through the storage circuit $d\ e$ and the low impedance toroidal coil $z$ of a magnetostrictive echo sounding transmitter.

The armature $g$ and the duplex contact $h\ i$, as shown in Figure 1, are mounted on an arm stressed by the tension spiral spring $k$ and, as shown in Figure 2, are mounted on a strip $q$ stressed by the bow shaped spring $k^1$ but obviously, any equivalent elastic arrangement can be substituted provided that the arrangement employed can be adjusted so as to complete the circuit through the contacts $m\ n$ at the end of a period of time equal to that necessary for the voltage oscillation to reach a maximum in the circuit $d\ e$ so that the condenser $e$ is discharged at its point of maximum potential.

Alternatively, other electro-mechanical means may be used to actuate the armature $g$ at the desired time intervals or the duplex contact $h\ i$ may be mounted on an arm deflected at the required intervals of time by a cam or mechanical equivalent rotating or otherwise operating at the appropriate speed, so as to obviate the necessity for the springs $k$ or $k^1$.

The arrangements shown in the drawing by way of example are suitable for use with supersonic echo sounding mechanism, and a direct current supply at a potential of 110 volts, the electro-magnetically operated contact being as shown in Figure 2.

In this arrangement the resistance $b$ has a value of say 350 ohms and the resistance $c$ a value of say 90 ohms, the iron cored choke $d$ an inductance of say 10 henries and a resistance of say 110 ohms and the condenser $e$ a value of say 4 microfarads, whilst the toroidal coil $z$ has a resistance of say 4 ohms, an inductance of say 100 micro-henries, and a self capacity of say 4 microfarads to give an oscillatory discharge but if in other use a different discharge, say a very short, sharp single electrical pulse is required, this can be obtained by a suitable modification of values.

The switch $a$ is operated say three times per second by the motor $a'$ so as to complete the circuit from the continuous current mains through the electromagnet $f$, after a lapse of about three one-hundredths of a second the armature $g$ is raised so as to complete the circuit from the negative main through the contact $m\ h$, choke $d$ and resistance $c$ to the positive main.

The switch $a$ remains closed for say one quarter of a second to effect the required storage of energy in the circuit $d\ e$.

At the end of the quarter of a second the switch $a$ interrupts the electrical connections between the mains and the electromagnet $f$, with the result that at about one hundredth of a second later a signal is transmitted as the armature $g$ being no longer attracted by the magnet $f$ is drawn downwards by the spring so as to close the contacts $n\ i$. The switch $a$ remains open for about seven one-hundredths of a second after which the cycle of operations is repeated.

When electrical components of the specified values are employed, at the moment of interruption of the charging current to the storage circuit $d\ e$, the energy of the magnetic field $d$ will be transferred to the condenser $e$ and electrical oscillations having a frequency of about twenty-five cycles per second will be set up.

The armature $g$ is so adjusted that contact between $i$ and $n$ is effected about one hundredth of a second after the separation of the contacts $h$ and $m$, so that the condenser $e$ is discharged at the first voltage peak of the voltage oscillation, that is to say, when the discharge of the condenser $e$ is at its point of maximum potential.

It will be clear to those acquainted with this kind of apparatus that the value of the various parts can be selected so as to produce the required output from the available direct current supply.

As stated above it is necessary in order to obtain the maximum discharge from the condenser $e$ through the low impedance toroidal coil $z$ that the movable contact $h\ i$ should cooperate with the stationary contact $n$, which includes the coil $z$ in electrical series with the oscillatory storage circuit $d\ e$ at that moment when the first voltage oscillation is a maximum. This result may be achieved either by adjusting the mass of the armature $g$ and the movable contact $h\ i$, the strength of the spring $k$ and the distance travelled by the contact $h\ i$ so that contact is effected at the specified moment, or by arranging the cam or equivalent device operating the contact mechanically so that the discharge takes place in the time relation specified above.

In some cases the time periods of operation may be varied relatively to one another to provide convenient means for controlling the current discharged or the potential of such discharge.

With such an arrangement as has been described above, if the electromagnetic switch $f\ g$ and its associated contacts is employed as a remote control, it has been found that the time lag is more or less independent of variations in the mains potential, and that as such apparatus can be constructed without sliding parts needing lubrication or other attention, the apparatus as a whole can be installed close to a magnetostrictive echo sounding transmitter, thus avoiding losses in the conductors conveying the discharge current and necessitating only two conductors in connection with the mains, thereby simplifying the installation and enhancing the reliability with which operation can be effected.

In the example described which includes a magnetostrictive echo sounding transmitter the contact $m$ is provided because the potential at the moment of discharge of the condenser $e$ is such that it is desirable to isolate it from the remainder of the circuit, but when such discharge potential does not exceed say about 250 volts, the contact m may be omitted, in which case the armature g is so adjusted that contact between i and n is effected in timed relation to the breaking of the circuit by a.

I claim:—

1. Electrical energy extracting and converting means having in combination an electrical inductance shunted by an electrical condenser to form a tuned oscillatory electrical circuit, a direct current supply, two output terminals, an electromagnet in shunt with said circuit, an elastically mounted armature with a definite periodic time value for cooperating with said electromagnet, a mechanically actuated switch for connecting said circuit and said electromagnet to said supply intermittently, a contact on said armature connected to one side of said circuit, a conductor connecting the other side of said circuit to one output terminal, and a stationary contact connected to the other output terminal to cooperate with the contact on said armature at the first voltage peak of the condenser voltage oscillation.

2. Electrical energy extracting and converting means having in combination an electrical inductance shunted by an electrical condenser to form a tuned oscillatory electrical circuit, a direct current supply, two output terminals, an electromagnet in shunt with said circuit, an elastically mounted armature with a definite periodic time value for cooperating with said electromagnet, a stationary contact, a mechanically actuated switch for intermittently connecting one pole of the direct current supply with the electromagnet, one side of the said circuit and one of the output terminals and the other pole of the direct current supply with the electromagnet and the stationary contact, a second stationary contact connected to the other output terminal, and a duplex contact on said armature connected to the other side of said circuit to cooperate alternately with the first named stationary contact to charge the said circuit and with the second named stationary contact to discharge the said circuit at the first voltage peak of the condenser voltage oscillation.

3. Electrical energy extracting and converting means having in combination an electrical inductance shunted by an electrical condenser to form an oscillatory electrical circuit, a direct current supply, a mechanically actuated switch for connecting said circuit intermittently to said supply, two output terminals, a conductor connecting one side of said circuit to one of said output terminals, a stationary contact connected to the other output terminal, a movable contact connected to the other side of said circuit, and actuating means for said movable contact to connect the same to said stationary contact at the first voltage peak of the condenser voltage oscillation.

D. O. SPROULE.